United States Patent
Dreharov

(10) Patent No.: US 10,756,812 B2
(45) Date of Patent: Aug. 25, 2020

(54) TRANSMISSION DEVICE FOR A MOTOR VEHICLE FOR TRANSMITTING SIGNALS

(71) Applicant: Dr. Ing. h.c. F. Porsche Aktiengesellschaft, Stuttgart (DE)

(72) Inventor: Nikolay Dreharov, Ludwigsburg (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 16/194,412

(22) Filed: Nov. 19, 2018

(65) Prior Publication Data

US 2019/0288772 A1  Sep. 19, 2019

(30) Foreign Application Priority Data

Mar. 16, 2018 (DE) .......... 10 2018 106 128

(51) Int. Cl.

| | |
|---|---|
| *H04B 7/24* | (2006.01) |
| *H04M 1/60* | (2006.01) |
| *H04B 1/08* | (2006.01) |
| *H04L 29/08* | (2006.01) |
| *H04R 3/12* | (2006.01) |
| *H04L 29/06* | (2006.01) |
| *H04S 7/00* | (2006.01) |
| *H04R 27/00* | (2006.01) |
| *H04M 1/00* | (2006.01) |
| *G06F 16/00* | (2019.01) |

(Continued)

(52) U.S. Cl.
CPC ............... *H04B 7/24* (2013.01); *G06F 16/00* (2019.01); *H04B 1/082* (2013.01); *H04L 65/4069* (2013.01); *H04L 67/12* (2013.01); *H04M 1/00* (2013.01); *H04M 1/6091* (2013.01); *H04R 3/12* (2013.01); *H04R 27/00* (2013.01); *H04S 7/30* (2013.01); *H04R 2227/003* (2013.01); *H04R 2420/07* (2013.01); *H04R 2499/13* (2013.01); *H04W 4/48* (2018.02); *H04W 4/80* (2018.02)

(58) Field of Classification Search
CPC ....... H04B 1/082; H04B 7/24; H04M 1/6083; H04L 67/12
USPC ........ 455/67.11, 569.1, 569.2, 3.01
See application file for complete search history.

(56) References Cited

U.S. PATENT DOCUMENTS

| 8,542,846 B2 * | 9/2013 | Matejczyk | H04R 5/02 381/302 |
|---|---|---|---|
| 2007/0015485 A1 * | 1/2007 | DeBiasio | H04B 1/082 455/345 |

(Continued)

FOREIGN PATENT DOCUMENTS

| DE | 102014218162 A1 | 3/2015 |
|---|---|---|
| DE | 102014226905 A1 | 6/2016 |
| DE | 102016118848 A1 | 4/2017 |

*Primary Examiner* — John J Lee
(74) *Attorney, Agent, or Firm* — Leydig, Voit & Mayer, Ltd.

(57) ABSTRACT

A transmission device for a motor vehicle for transmitting sound signals includes a receiver unit configured to receive the sound signals, a transmission unit configured to transmit the received sound signals to a standard reproduction device configured to play back the sound signals, and a management unit configured to wirelessly ascertain at least one supplementary reproduction device wishing to receive, for the purpose of playing back, the sound signals. The transmission unit is further configured to wirelessly send the received sound signals to the at least one supplementary reproduction device.

13 Claims, 1 Drawing Sheet

(51) Int. Cl.
   *H04W 4/48*   (2018.01)
   *H04W 4/80*   (2018.01)

(56) References Cited

U.S. PATENT DOCUMENTS

| | | | |
|---|---|---|---|
| 2013/0030645 A1* | 1/2013 | Divine | B60K 35/00 |
| | | | 701/36 |
| 2013/0070082 A1* | 3/2013 | Chen | H04N 21/41422 |
| | | | 348/118 |
| 2013/0282809 A1 | 10/2013 | Stanley et al. | |
| 2015/0081671 A1 | 3/2015 | Bankowski | |
| 2017/0104824 A1 | 4/2017 | Bajwa et al. | |
| 2017/0353693 A1* | 12/2017 | Semsey | B60N 2/002 |

* cited by examiner

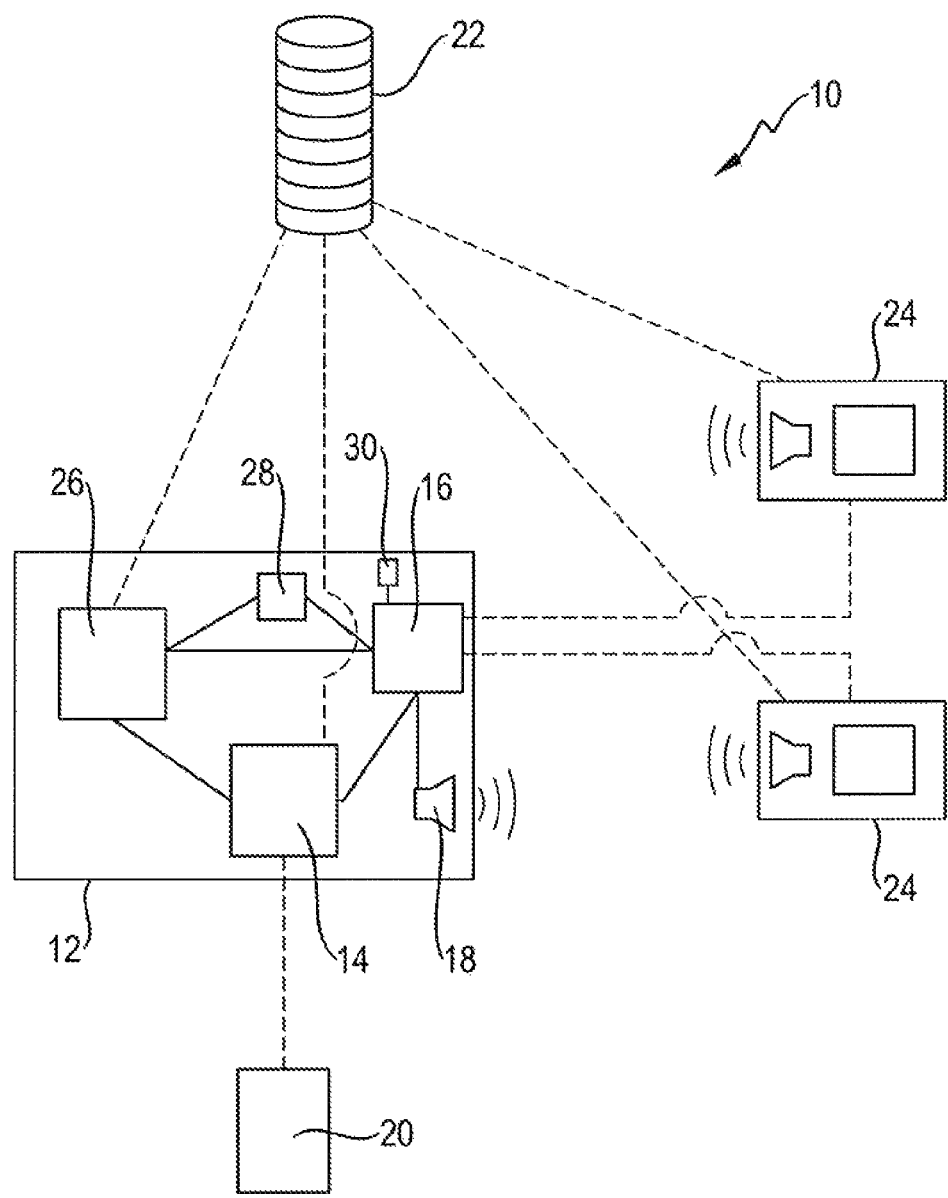

TRANSMISSION DEVICE FOR A MOTOR VEHICLE FOR TRANSMITTING SIGNALS

CROSS REFERENCE TO RELATED APPLICATIONS

This application claims benefit to German Patent Application No. DE 10 2018 106 128.5, filed Mar. 16, 2018, which is hereby incorporated by reference herein.

FIELD

The invention relates to a transmission device that can be used to transmit signals in a motor vehicle.

BACKGROUND

US 2007/0015485 A1 discloses the practice of connecting an audio player wirelessly to a transmitter provided in a motor vehicle in order to be able to use loudspeakers of the radio system of the motor vehicle to deliver sound signals from the audio player to the interior of the motor vehicle.

SUMMARY

In an embodiment, the present invention provides a transmission device for a motor vehicle for transmitting sound signals. The transmission device includes a receiver unit configured to receive the sound signals, a transmission unit configured to transmit the received sound signals to a standard reproduction device configured to play back the sound signals, and a management unit configured to wirelessly ascertain at least one supplementary reproduction device wishing to receive, for the purpose of playing back, the sound signals. The transmission unit is further configured to wirelessly send the received sound signals to the at least one supplementary reproduction device.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

The FIGURE shows a schematic basic depiction of a distributed reproduction system according to an embodiment of the invention.

DETAILED DESCRIPTION

There is a constant need for a plurality of motor vehicle occupants to be provided with played-back signals simply and inexpensively.

Embodiments of the invention demonstrate measures that allow signals to be delivered to a plurality of motor vehicle occupants simply and inexpensively.

According to embodiments of the invention, transmission devices for a motor vehicle for transmitting signals, in particular sound signals, are provided, having a receiver unit for receiving the signals, a transmission unit for transmitting the received signals to a standard reproduction device for playing back the signals, and a management unit for wirelessly ascertaining supplementary reproduction devices wishing to receive for the purpose of playing back the signals, wherein the transmission unit is configured to wirelessly send the received signals to the at least one supplementary reproduction device.

The management unit allows further supplementary reproduction devices to connect in addition to the standard reproduction device provided in the motor vehicle anyway. The supplementary reproduction device is, by way of example, a smartphone whose loudspeaker can be used to play back sound signals, in particular music, and/or whose display can be used to play back image signals, in particular images and/or videos. The number of reproduction devices can be increased thereby, so that the played-back signals can be sensed at different locations inside a motor vehicle and/or outside the motor vehicle. A loss of quality in the played-back signals as a result of a person at a position remote from the place at which the played-back signals are delivered can be prevented thereby. As a particular preference, the supplementary reproduction device is part of another motor vehicle, which means that the signals can also be sensed through a motor vehicle bodywork. This allows motor vehicle occupants who are in different motor vehicles, for example, to be able to listen to the same music. In particular, in the case of a group of people who are known to one another, this can increase the feeling of togetherness and the bond with one another, which means that a strengthened communal spirit that is perceived as pleasant can be created. The number of motor vehicle occupants benefitting from the reproduction of the signals is therefore not limited to the number of seats in a single motor vehicle, but rather can be increased almost arbitrarily by means of the number of supplementary reproduction devices connected via the management unit and supplied with signals by the transmission unit in other motor vehicle. The supplementary reproduction device may, by way of example, be part of a radio system and/or multimedia system of the other motor vehicle, so that joint use of an infrastructure that is already present anyway is possible inexpensively. This allows multiple motor vehicles to play back the same signals at the same time, so that a larger area can be adequately provided with sound, for example. In particular in a traffic jam or for a joint celebration, this can lift the mood of the vehicle occupants and other people involved. The wireless connection of the supplementary reproduction devices, which are, in particular, installed in other motor vehicles anyway, to the transmission device allows signals to be delivered to a plurality of motor vehicle occupants simply and inexpensively.

The transmission device and the supplementary reproduction devices may be in a master-slave relationship with one other. To this end, the respective supplementary reproduction device can, by way of example, by built into a mode of operation in which the supplementary reproduction device can be used by the transmission device. By way of example, the supplementary reproduction device can use an Internet connection to store in a database that it wishes to obtain signals from all or a determined list of transmission devices. To this end, the database may contain a provided subscription system or the like that the supplementary reproduction device can use to subscribe to the signals from a determined transmission device. If required, methods of payment can already be agreed in this regard if the transmission device subscribed to does not wish to make its signals available free of charge.

When the transmission device is switched on in order to deliver signals, the management unit can communicate with the database, in particular wirelessly via an Internet connection, and identify the supplementary reproduction devices stored as wishing to receive the signals from the transmission device. The transmission unit can then send the signals to those supplementary reproduction devices that can be reached by the transmission unit. To this end, the transmission unit can in particular send the signals via an Internet connection to the supplementary reproduction device that is likewise connected to the Internet via an Internet connection at this time. Preferably, the transmission unit can in this context drive out and cover up other signals played back by this supplementary reproduction device at this moment. The signals sent by the transmission device can be given priority over other signals able to be played back by the supplementary reproduction device. Preferably, this priority can be cancelled manually, so that the signals sent by the transmission device are no longer played back by the supplementary reproduction device.

The subscription system also allows the transmission device and the supplementary reproduction devices to be able to be part of a consciously selected united community. In particular when the transmission unit has a limited range, the automatic detection of a supplementary reproduction device in range can signal the physical proximity of a member of this community by playing back the signals sent by the transmission device, so that people with common interests and membership of the same community can find one another more easily, for example in order to enjoy the same music together.

In particular, the management unit is configured to detect supplementary reproduction devices wishing to receive in remotely positioned motor vehicles. This allows the reproduction devices of different motor vehicles to be used to play back the signals. As a result, multiple motor vehicles can provide a correspondingly larger area with sound, for example.

Preferably, the receiver unit is configured for wirelessly receiving the signals. As a result, a playlist can be wirelessly sent from an audio player to the receiver unit, for example, in order to play back the signals stored on the audio player.

As a particular preference, the receiver unit is configured to receive the signals from a remotely positioned data source, wherein in particular the data source is accessible via an Internet port to the receiver unit. The data source may store pieces of music, videos, live streams or other multimedia data, for example, which can be retrieved by the receiver unit by means of a streaming method, for example. The data source can provide a curated content in digital form, for example, which has been collected for a particular community to suit target groups.

In particular the signals are part of a data source having discrete data packets, wherein a selection unit for selecting a data packet to be played back and/or for stipulating a defined order of multiple data packets to be played back in succession is provided, the selection unit being configured to detect and process a desired request sent from the supplementary reproduction device to the selection unit for playing back a determined selected data packet and/or stipulation of a defined order of multiple data packets to be played back in succession. The individual data packets may be individual music tracks, for example, listed in a determined order of play back in the data source. The transmission unit can notify the supplementary reproduction devices of the order of playback, for example. In this regard, the supplementary reproduction device can send a signal to the transmission device asking for a different order and/or intended to terminate a particular data packet or not to play it back in the first place. This allows interaction between the transmission device and the supplementary reproduction devices. By way of example, there may be provision for the supplementary reproduction devices to be able to cast a vote for a particular number of data packets, the data packet with most votes being played back next. This allows the people positioned at the supplementary reproduction devices to influence the data packets to be played back, allowing the communal spirt of the people involved to be improved and intensified.

Preferably, a synchronization device for synchronizing the timing of the signals played back by the standard reproduction device and signals played back by the supplementary reproduction device is provided. The synchronization device can ensure that the standard reproduction device and the supplementary reproduction device play back the signals as precisely at the same time as possible. Propagation time errors and/or an internal computation complexity for processing the signals can be taken into consideration by the synchronization device and preferably synchronized with a common reference time. This makes it possible to prevent the sensing of the signals from being impaired by staggered reproduction of the signals by different reproduction devices.

As a particular preference, a remote control module for wirelessly operating the transmission device from a remotely positioned controller is provided. The transmission device can therefore be switched on and off by a suitable controller and/or a selection can be made for the signals to be played back. In particular, the controller used can be a smartphone that can use a suitable app to communicate with the transmission device wirelessly, for example via a radio connection such as Bluetooth and/or an Internet connection.

In particular, a position determination system for determining the physical position of the transmission device is provided, wherein the transmission unit is configured to send the physical position of the transmission device to at least one supplementary reproduction device. This allows a person at the location of the supplementary reproduction device to know the location of the transmission device and to be able to approach this location, so that the people at the location of the transmission device and the people at the location of the supplementary reproduction device can meet and encounter one another. This allows people who like the same music, for example, to meet at a common location and get to know one another.

Embodiments of the invention further provide motor vehicles having an installed transmission device, which may be designed and developed as described above. The wireless connection of the supplementary reproduction devices, which are, in particular, installed in other motor vehicles anyway, to the transmission device allows signals to be delivered to a plurality of motor vehicle occupants simply and inexpensively.

Embodiments of the invention further provide distributed reproduction systems for playing back signals, having a transmission device installed in a first motor vehicle, which transmission device may be designed and developed as described above, for transmitting signals, in particular sound signals, and at least one supplementary reproduction device positioned remotely from the first motor vehicle for playing back the signals, wherein the supplementary reproduction device is installed in a second motor vehicle, which is different than the first motor vehicle. The wireless connection of the supplementary reproduction devices, which are, in particular, installed in other motor vehicles anyway, to the transmission device allows signals to be delivered to a plurality of motor vehicle occupants simply and inexpensively.

The distributed reproduction system 10 depicted in the FIGURE has a transmission device 12 permanently installed in a first motor vehicle. The transmission device 12 has a receiver unit 14 that can receive signals that may be digitized pieces of music, for example. The signals received by the receiver unit 14 can be transmitted to a transmission unit 16, which transmits the possibly conditioned signals to a standard reproduction device 18 configured as a loudspeaker, for example. The signals can be transmitted wirelessly by an external controller 20, for example, that can in particular also be used to operate the transmission device 12. The controller 20 may be a smartphone, for example, that can use an app provided for the purpose to control the transmission device 12 and to transmit signals stored in the controller 20 to the transmission device 12. It is also possible for the transmission device 12 to obtain the signals to be played back from an external data source 22, in particular available via an Internet port, the signals to be played back preferably being able to be selected by the controller 20.

The transmission unit 16 can additionally transmit the signals to be played back to further supplementary reproduction devices 24. The supplementary reproduction devices 24 can transmit their corresponding wish to receive and/or can store it in the data source 22. This wish to receive can be ascertained wirelessly in a management unit 26 by virtue of the management unit 26 retrieving the information stored in the data source 22 and/or obtaining an applicable signal emitted wirelessly by the supplementary reproduction device 24. The supplementary reproduction devices 24 may likewise be permanently installed in a further motor vehicle.

A synchronization device 28 can be used to ensure that both the signals played back by the standard reproduction device 18 and the signals played back by the supplementary reproduction devices 24 are played back at the same time, so that the signals played back are prevented from being staggered in time. In the exemplary embodiment depicted, there is also provision for the position data from a position determination system 30 to be sent from the transmission unit 16 to the supplementary reproduction devices 24, so that the owners of the supplementary reproduction devices 24 can find and meet the owner of the transmission device 12, as a result of which the signals played back by the reproduction devices 18, 24 can overlap.

The function described or the transmission device can advantageously also be used for autonomously driving vehicles in which the passengers would play musical instruments or sing. If the system described is used bidirectionally, so that the individual sound track from one motor vehicle and the sound tracks from other vehicles can be mixed with one another, it would be possible to play together like a band on a stage/in a recording studio.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A transmission device for a motor vehicle for transmitting sound signals, the transmission device comprising:
   a receiver unit configured to receive the sound signals;
   a management unit configured to wirelessly obtain, from at least one supplementary reproduction device, a request to receive, for the purpose of playing back, the sound signals;
   a transmission unit configured to (i) transmit the received sound signals to a standard reproduction device configured to play back the sound signals and (ii) wirelessly send the received sound signals to the at least one supplementary reproduction device; and
   a synchronization device configured to synchronize timing of the sound signals played back by the standard reproduction device and the sound signals played back by the at least one supplementary reproduction device.

2. The transmission device as claimed in claim 1, the transmission device further comprising
   the standard reproduction device configured to play back the sound signals,
   wherein the transmission device is installed in the motor vehicle.

3. The transmission device as claimed in claim 1, wherein the management unit is configured to detect the at least one supplementary reproduction device in at least one remotely positioned motor vehicle.

4. The transmission device as claimed in claim 1, wherein the receiver unit is configured to wirelessly receive the sound signals.

5. The transmission device as claimed in claim 1, wherein the receiver unit is configured to receive the sound signals from a remotely positioned data source, wherein the remotely positioned data source is accessible via an Internet port for the receiver unit.

6. The transmission device as claimed in claim 1, wherein the sound signals are part of a data source having discrete data packets, wherein a selection unit for selecting a data packet to be played back and/or for stipulating a defined order of multiple data packets to be played back in succession is provided, the selection unit being configured to detect and process a desired request sent from the at least one supplementary reproduction device to the selection unit for playing back a determined selected data packet and/or stipulation of a defined order of multiple data packets to be played back in succession.

7. The transmission device as claimed in claim 1, further comprising a remote control module configured to wirelessly operate the transmission device from a remotely positioned controller.

8. A motor vehicle having a transmission device as claimed in claim 1 installed therein.

9. The transmission device as claimed in claim 1, wherein the standard reproduction device is installed in the motor vehicle.

10. The transmission device as claimed in claim 9, wherein the standard reproduction device is a loudspeaker of the motor vehicle.

11. The transmission device as claimed in claim 10, wherein the transmission unit is configured to transmit the received sound signals to the standard reproduction device via a wired connection.

12. A transmission device for a motor vehicle for transmitting sound signals, the transmission device comprising:
 a receiver unit configured to receive the sound signals;
 a management unit configured to wirelessly obtain, from at least one supplementary reproduction device, a request to receive, for the purpose of playing back, the sound signals;
 a transmission unit configured to (i) transmit the received sound signals to a standard reproduction device configured to play back the sound signals and (ii) wirelessly send the received sound signals to the at least one supplementary reproduction device; and
 a position determination system configured to determine a physical position of the transmission device, wherein the transmission unit is configured to send the physical position of the transmission device to the at least one supplementary reproduction device.

13. A distributed reproduction system configured to play back signals, comprising:
 a transmission device for transmitting sound signals, the transmission device being installed in a first motor vehicle, the transmission device comprising:
  a receiver unit configured to receive the sound signals;
  a standard reproduction device configured to play back the sound signals;
  a management unit configured to wirelessly obtain, from at least one supplementary reproduction device, a request to receive, for the purpose of playing back, the sound signals; and
  a transmission unit configured to transmit the received sound signals to the standard reproduction device; and
 a supplementary reproduction device configured to play back the sound signals,
 wherein the supplementary reproduction device is positioned remotely from the first motor vehicle and installed in a second motor vehicle different than the first motor vehicle, and
 wherein the transmission unit is further configured to wirelessly send the received sound signals to the supplementary reproduction device.

\* \* \* \* \*